US008621452B2

(12) United States Patent
Cobb

(10) Patent No.: US 8,621,452 B2
(45) Date of Patent: Dec. 31, 2013

(54) DEVICE DRIVER ROLLBACK

(75) Inventor: Jason T. Cobb, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 103 days.

(21) Appl. No.: 13/047,578

(22) Filed: Mar. 14, 2011

(65) Prior Publication Data

US 2011/0167300 A1   Jul. 7, 2011

Related U.S. Application Data

(63) Continuation of application No. 10/984,054, filed on Nov. 9, 2004, now Pat. No. 7,934,213.

(51) Int. Cl.
G06F 9/445   (2006.01)
G06F 9/44    (2006.01)

(52) U.S. Cl.
USPC .......................................... 717/174; 717/170

(58) Field of Classification Search
USPC ....................................................... 717/174
See application file for complete search history.

(56) References Cited

U.S. PATENT DOCUMENTS

| | | | |
|---|---|---|---|
| 4,507,751 A | 3/1985 | Gawlick et al. | |
| 5,390,301 A * | 2/1995 | Scherf | 719/321 |
| 6,363,499 B1 | 3/2002 | Delo et al. | |
| 6,523,166 B1 | 2/2003 | Mishra et al. | |
| 7,082,553 B1 | 7/2006 | Wang | |
| 7,188,368 B2 | 3/2007 | Swimmer et al. | |
| 7,934,213 B2 | 4/2011 | Cobb | |
| 2002/0124245 A1 | 9/2002 | Maddux et al. | |
| 2003/0121033 A1 | 6/2003 | Peev et al. | |
| 2003/0126059 A1 | 7/2003 | Hensley et al. | |
| 2004/0261070 A1 | 12/2004 | Miller et al. | |
| 2005/0091502 A1 | 4/2005 | Cargille et al. | |
| 2006/0026319 A1 | 2/2006 | Rothman et al. | |

OTHER PUBLICATIONS

Columbus, Jun. 29, 2001, "Exploring Windows XP's Device Driver Rollback and System Restore", informIT, accessed Sep. 13, 2012 at http://www.informit.com/articles/article.aspx?p=21919.*
"Final Office Action", U.S. Appl. No. 10/984,054, (Jan. 5, 2010),30 pages.
"How to Roll Back a Device Driver", Microsoft Corporation, Accessed Sep. 26, 2008 at <http://www.microsoft.com/windowsxp/using/helpandsupport/driverrollback.mspx>, (Nov. 9, 2001),2 pages.
"Non Final Office Action", U.S. Appl. No. 10/984,054, (May 14, 2009),24 pages.

(Continued)

*Primary Examiner* — James D Rutten
(74) *Attorney, Agent, or Firm* — Wolfe-SBMC

(57) ABSTRACT

Techniques for device driver management/installation are provided. In at least some embodiments, a device driver management system can be employed by a user to selectively rollback a currently installed device driver to one or a plurality of previously installed device driver(s). Additionally, the system can be employed by the user to revert to a pristine state of not having the device driver installed at all, for example, the NULL driver (e.g., in the situation in which the first driver installed on the device causes machine instability). The system stores information associated with driver(s) running on a specific device and allows a user to selectively revert to any one of a plurality of previously installed device driver(s), for example, if they experience a problem with a newer driver. Rollback point(s) can be stored, for example, in the system registry.

20 Claims, 7 Drawing Sheets

(56) References Cited

OTHER PUBLICATIONS

"Non Final Office Action", U.S. Appl. No. 10/984,054, (Oct. 8, 2008),19 pages.

"Notice of Allowance", U.S. Appl. No. 10/984,054, (Jan. 21, 2011),14 pages.

"Windows History", Microsoft Corporation, Accessed Sep. 30, 2008 at <http://www.microsoft.com/windows/WinHistoryProGraphic.mspx>, (Jun. 30, 2003),2 pages.

"Windows XP Guide: Device Manager", Cached Jul. 2, 2008 by Google <www.google.com>,, originally published at <http://www.wintechhelp.com/xp_device_mgr.htm>,(Jul. 2, 2008),12 pages.

Akgul, T. et al., "Assembly instruction level reverse execution for debugging.", *ACM Trans. Softw. Eng. Methodol*, 13, 2. DOI=http://doi.acm.org/10.1145/1018210.1018211, (Apr. 2004),pp. 149-198.

Ballew, Joli "Windows XP System Restore is Easy to Use", *Using Windows XP*, available at <http://www.microsoft.com/windowsxp/using/helpandsupport/getstarted/ballew_03may19.mspx>,(May 19, 2003),7 pages.

Harder, Bobbie "Microsoft Windows XP System Restore", *Windows XP Technical Articles*, available at <http//msdn.microsoft.com/en-us/library/ms997627(printer).aspx>,(Apr. 2001),8 pages.

Ogletree, et al., "Microsoft Windows XP Unleashed", *Sams*, Excerpt from Chapter 23, (Dec. 11, 2001),4 pages.

Peters, M et al., "Parallel distributed simulation and modeling methods: an algorithm for fully-reversible optimistic parallel simulation.", *In Proceedings of the 35th Conference on Winter Simulation: Driving innovation* (New Orleans, Louisiana) *Winter Simulation Conference.*, (Dec. 2003),864-871.

\* cited by examiner

DEVICE DRIVER ROLLBACK

RELATED APPLICATIONS

This application is a continuation of and claims priority to U.S. application Ser. No. 10/984,054, entitled "Device Driver Rollback," filed on Nov. 9, 2004, the disclosure of which is incorporated in its entirety by reference herein.

BACKGROUND

A device driver (e.g., driver) is a software component (e.g., program) that permits a computer system to communicate with a particular device. Because the driver handles device specific features, an operating system is freed from the burden of having to understand and support needs of individual hardware devices. However, if a driver is problematic, the particular device controlled by the driver can fail to work properly and can even be completely inoperative. Such problems are especially problematic for key devices such as a video card, hard drive controller or hard drive. Additionally, a problematic driver can often cause an operating system to become unstable, create problems with a whole computer system and may even lead to system operation halting. If properly identified, problematic driver(s) can be replaced with non-faulty driver(s) to mitigate further problems with the device, operating system and/or computer system.

Computer systems today often employ a significant number of devices and corresponding device drivers. For example, a typical computer system can utilize devices such as sound cards, bus controllers, video capture devices, audio capture devices, universal serial bus devices, firewire controllers and devices, DVD drives, network cards, DSL modems, cable modems, LCD monitors, monitors, laser printers, ink jet printers, fax machines, scanners, digital cameras, digital video cameras and the like. Additionally, a single device can employ more than one device driver. For example, a typical 3-D video card can require numerous device drivers.

Most drivers are provided by third parties. A driver is added to the system, for example, whenever a user adds a new piece of hardware to their machine. Additionally drivers are frequently updated to fix problems/bugs in the driver, add performance and/or add other features. Most drivers run in the kernel of the operating system; which means if they do anything wrong it can be fatal to the running of the entire computer.

SUMMARY

The following presents a simplified summary in order to provide a basic understanding of some aspects of one or more embodiments. This summary is not intended to be an extensive overview or to identify key/critical elements or to delineate the scope of the claimed embodiments. Its purpose is to present some concepts of the claimed embodiments in a simplified form as a prelude to the more detailed description that is presented later.

Techniques are provided for device driver management/installation systems and methods. The device driver management system can be employed by a user to selectively rollback a currently installed device driver to one of a plurality of previously installed device driver(s), for example, if the user experiences a problem with a newer driver. Additionally, the system can be employed by the user to revert to a pristine state of not having the device driver installed at all, for example, the NULL driver (e.g., in the situation in which the first driver installed on the device causes machine instability).

In accordance with one or more embodiments, the system includes a rollback component and a rollback information data store. The rollback data information store can store rollback information (e.g., rollback point(s)) associated with device drivers. For example, the rollback point(s) can include information associated with software installed on a device (e.g., driver node) and device instance identifier(s) associated with device(s) that at any given time had the driver installed on them. "Device instance identifier(s)" refer to a system-supplied device identification string that uniquely identifies an instance of a device in the system.

The rollback component can receive a request to rollback the currently installed software (e.g., driver node). In response, the rollback component can provide information regarding previously installed software (e.g., driver nodes), if any, available for a user to revert to with respect to the currently installed software (e.g., driver node). Based, at least in part, upon selection of a rollback device driver or a user's desire to revert back to the device's pristine state, the rollback component can facilitate removal of the currently installed software (e.g., driver node) and installation of the selected previously installed software (e.g., driver node).

Further to some embodiments, techniques are provided for the system to store information associated with rollback point(s) in a data store, for example the system registry. Stored rollback point instance keys can include, for example, an initialization file path (InfPath), a description, a manufacturer, a section name, a hardwareID and an associated device instance identifiers (AssoicatedDeviceInstanceIdentifiers). The InfPath, description, manufacturer, section name, and hardwareId are used to uniquely identify a given driver node (e.g., driver assembly). Therefore these values allow the system to get back to the exact software (e.g., driver node) that was previously installed on the device. The associated device instance identifiers (e.g., AssociatedDeviceInstanceIdentifiers) can be a multi-string value that allows the system to track which device(s) have a particular rollback point as one of their rollback history. Thus, in this example, if multiple devices share the same driver(s) then if driver(s) are rolled back on one device, optionally, they can be rolled back on all device(s) sharing the driver(s) (e.g., if one device has a problem with the driver(s), it is likely that all device could have a problem with the driver(s)).

In at least some embodiments, techniques are provided for a device driver installation system employed to facilitate driver installation and/or driver update. The system can include a driver installation component that can create a rollback point for a currently installed driver, if any, and install a different driver.

When a request to install a driver on a device is received by the driver installation component, the driver installation component determines whether an existing driver on the device. If so, the driver installation component creates a rollback point for that driver in the rollback information data store and the system registry. After creating the rollback point (if need), the associated device instance ids value is updated with the device instance Id for the particular device. Further, the driver installation component updates a property of the device that contains a list of previous rollback points, for example, under the restore point instance key. Finally, the new driver is installed on the device by the device installation component.

In one example, the driver installation component creates the rollback point only if there is a driver currently on the device, and that driver appears to be working properly.

DETAILED DESCRIPTION

Figure 1:
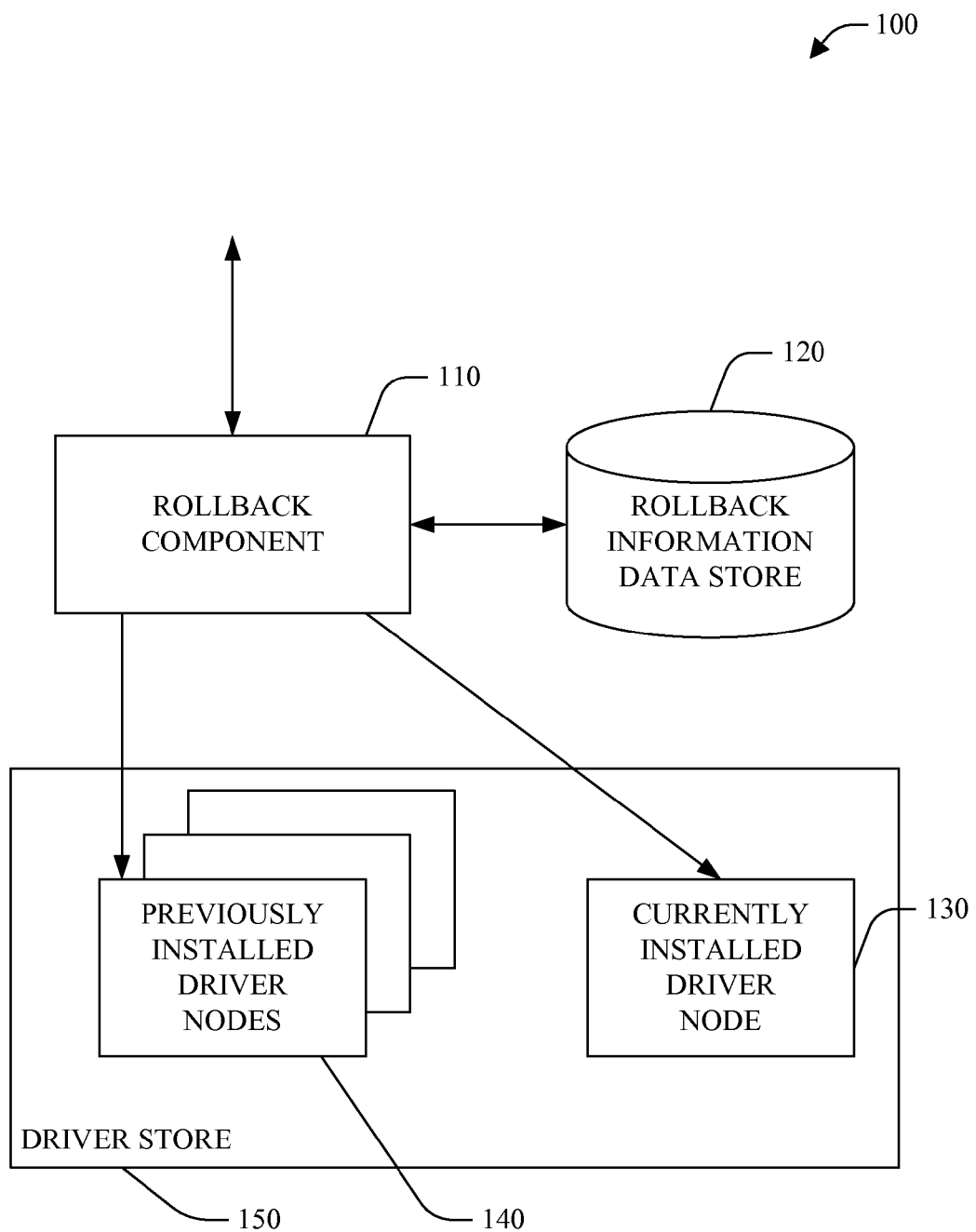
FIG. 1 is a block diagram of a device driver management system in accordance with one or more embodiments.

Embodiments are described with reference to the drawings, wherein like reference numerals are used to refer to like elements throughout. In the following description, for purposes of explanation, numerous specific details are set forth in order to provide a thorough understanding of certain embodiments. It may be evident, however, that embodiments may be practiced without these specific details. In other instances, well-known structures and devices are shown in block diagram form in order to facilitate describing one or more embodiments.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with one or more embodiments.

Referring to FIG. 1, a device driver management system 100 in accordance with an aspect of one or more embodiments. The system 100 can be employed by a user to selectively rollback a currently installed device driver to one of a plurality of previously installed device driver(s). Additionally, the system 100 can be employed by the user to revert to a pristine state of not having the device driver installed at all. The system 100 stores information associated with driver(s) running on a specific device and allows a user to selectively revert to any one of a plurality of previously installed device driver(s), for example, if they experience a problem with a newer driver. Further, the system 100 can allow a user to revert back to the device's pristine state of not having any driver at all, for example, in the situation in which the first driver installed on the device causes machine instability.

In one example, the system 100 is employed to roll back the driver to an older version of a driver. In another example, the system 100 is employed to rollback the driver to a newer version of the driver.

In yet a third example, the system 100 is employed to rollback the driver to a completely different driver. For example, a video card can have a stable business type driver and a fast (but less stable) gamer type driver. A user can install the gamer driver for performance reasons, but decide to rollback to the business driver because the gamer driver is frequently crashing.

The system 100 includes a rollback component 110 and a rollback information data store 120. The rollback data information store 120 can store rollback information (e.g., rollback point(s)) associated with device drivers. For example, the rollback information data store 120 can include a database that provides a reference from a full initialization file (e.g., INF) to a list of rollback point instance values. In this example, rollback point instance value(s) may not be searched thus resulting in a time-saving. The rollback point(s) can include information associated with software (e.g., a driver node) and device instance identifier(s) associated with device(s) that at any given time had the driver installed on them. "Driver node" refers to software installed on a device, for example, the DDInstall section of an initialization (e.g., INF) file as well as the match that caused the system to get to the DDInstall section. The system 100 can be employed by a user (not shown) to selectively revert from a currently installed driver node 130 to one of a plurality of previously installed driver nodes 140.

The currently installed driver node 130 and the previously installed driver nodes 140 can be stored, for example, in a driver store 150. The driver store 150 is a location (e.g., physical and/or virtual) where drivers are placed when they are installed. Each driver can be stored using a strong name to avoid any naming collisions. With the driver store 150 feature, there is no longer a need to backup existing drivers when a new driver is installed since a copy of the old driver already exists in the driver store 150. In this example, in order to facilitate selective rollback, the system 100 needs to store which specific drivers were previously installed on the device—rollback points.

The rollback component 110 can receive a request to rollback the currently installed driver node 130. In response, the rollback component 110 can provide information regarding previously installed driver nodes 140, if any, available for a user to revert to with respect to the currently installed driver node 130. Based, at least in part, upon selection of a rollback device driver or a user's desire to revert back to the device's pristine state, the rollback component 110 can facilitate removal of the currently installed driver node 130 and installation of the selected previously installed driver node 140. It is to be appreciated that the system 100, the rollback component 110, the rollback information data store 120, the currently installed driver node 130, the previously installed driver nodes 140 and/or the driver store 150 can be computer components as that term is defined herein.

Figure 2:
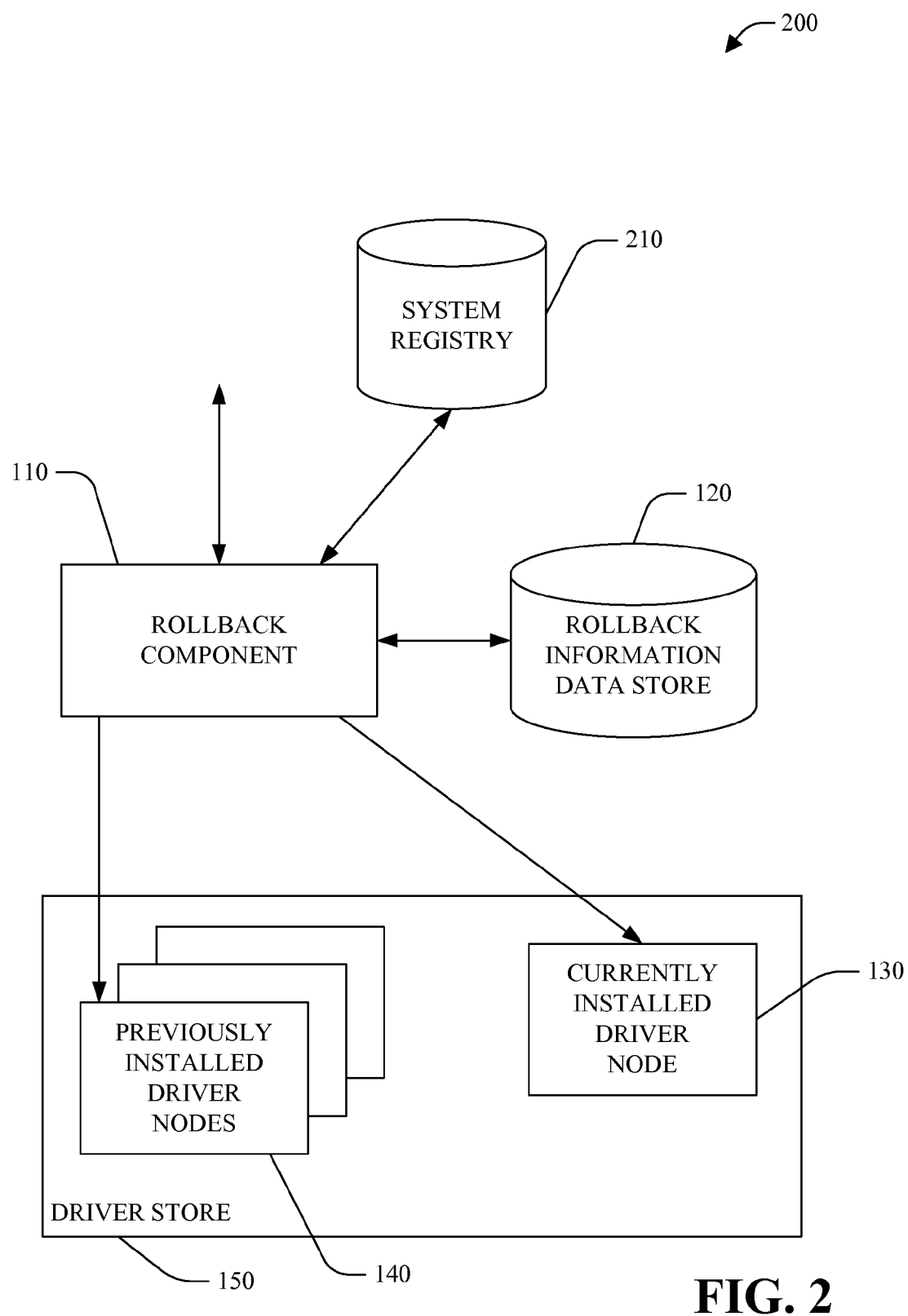
FIG. 2 is a block diagram of a device driver management system in accordance with one or more embodiments.

Turning to FIG. 2, a device driver management system 200 in accordance with one or more embodiments is illustrated. The system 200 includes a rollback component 110, a rollback information data store 120 and a system registry 210. The system registry 210 is a database used by the operating system to store configuration information. The system registry 210 can include sections associated with:

HKEY_Classes_Root—file associations and Object Linking and Embedding information HKEY_Current_User—preferences set for current user HKEY_User—the current user information for each user of the system HKEY_Local_Machine—settings for hardware, operating system, and installed applications HKEY_Current_Configuration—settings for the display and printers HKEY_Dyn_Data—performance data In one example, the rollback point instance values are stored under the driver store for each INF. Thus, the rollback point instance values will get cleaned up when the associated driver store entry is removed. Additionally, in order to prevent a restore points property (e.g., PKEY_Device_Restore-Points) associated with a particular device from getting out of date, the property can get cleaned up for each device when a driver package is removed from the driver store. Thus, when a driver package is removed from the driver store it will automatically clean up its registry data, which will remove all of the rollback points that point to it. It will then scan each device and go though their restore points property (e.g., PKEY_Device_RestorePoints) and remove any values that point to it.

Rollback points can be stored under the following registry key: HKEY_LOCAL_MACHINESOFTWAREMicrosoft\Windows\CurrentVersion\Reinstall. The rollback point instance keys are stored under this key having values range, for example, from 0x00000000 to 0xFFFFFFFF. In this example, under a given rollback point instance key are the following values:

InfPath
Description
Manufacturer
SectionName
HardwareId
Associated device instance identifier(s) (AssociatedDeviceInstanceIds)

InfPath, description, manufacturer, section name, and hardwareId are used to uniquely identify a given driver node (e.g., driver assembly). Therefore these values allow the system 200 to get back to the exact driver node 140 (e.g., driver assembly) that was previously installed on the device. The AssociatedDeviceInstanceIds is a multi-string (e.g., multi-sz) value that allows the system 200 to track which devices have a particular rollback point as one of their rollback history.

When a user desires to perform a driver rollback, the user provides a rollback request to the system 200, for example, by selecting a rollback and/or undo button of a user interface screen. In response to the rollback request, the rollback component 110 provides a list of rollback points, if any, to the user. The user then selects from the list of rollback points as the one the user would like to install on their device. The rollback component 110 then checks to see if the AssociatedDeviceInstanceIds contains other device(s) and if so can prompt the user to see if the user would like to install this driver on these other device(s) as well.

After installation of the previous driver is complete, device(s) that were just installed are removed from the list of the AssociatedDeviceInstanceIds. If the AssociatedDeviceInstanceIds is empty, the rollback point is deleted. The rollback component 110 further removes the rollback point from the device's property list of previous rollback points.

In a first example, a user plugs in a USB camera in the user's computer. The operating system finds a driver for the device on a web site and installs it. However, this driver has a bug and crashes the user's machine. The user boots into safe mode and goes to the device user interface associated with the system 200 and selects the rollback (e.g., undo) option. The system 200 removes the current driver from the device and since there wasn't an older driver it leaves no driver associated with the device. The device will not work at this point, but it also will no longer crash the machine.

In a second example, a user updates the driver for their display adapter to get better graphics for their game. After updating the driver their display looks strange. Thinking the driver is bad the user goes to the vendor's web site and chooses a different driver to update to. However this second new driver also doesn't work quite right. Now the user has a mess on their hands and they simply wish they could get back to the driver they were using earlier that worked. Using the system 200, the user can revert back directly to the driver they were using two iterations ago that they know was working.

In yet another example, a device driver is rolled back for not just a single device but all devices that have a particular restore point as their first rollback point. When a user selects to rollback the drivers on a given device, the rollback component 110 first checks the device's PKEY_Device_Restore-Points property in the system registry 210. If this property exists and is not NULL then rollback component 110 pull the first restore point instance off of the list as this will point the rollback component 110 to the driver node (e.g., driver assembly) that will now be installed on the device.

The rollback component 110 then opens up the rollback point instance key associated with this device and looks at the AssociatedDeviceInstanceIds multi-string value. The value informs the rollback component 110 all of the devices that have this restore point in their rollback history. The rollback component 110 then goes through all of the devices in this list and builds up a list of every one that has this restore point as the first rollback point in their PKEY_Device_RestorePoints property.

At this point, the rollback component 110 has the rollback point instance key and a list of device(s) to be rolled back to this driver node (e.g., driver assembly). The rollback component 110 can employ the InfPath, Description, Manufacturer, SectionName, and HardwareId to get back to the specific driver node that the rollback component 110 will rollback to. The rollback component 110 then initiates installation of the driver, for example, by calling the CM_Install_DevInst( ) with these parameters to install this driver node on all of these devices.

The restore point instance is then removed from the PKEY_ Device_RestorePoints property on all the devices that were just updated. The rollback component 110 also removes all of the device instance identifiers from the AssociatedDeviceInstanceIds multi-string value under the restore point instance key. If this value is empty then the restore point instance key is removed from the system registry 210 by the rollback component 110. Finally, the rollback information data store 120 is also updated by the rollback component 110. It is to be appreciated that the system 200 and/or the system registry 210 can be computer components as that term is defined herein.

Figure 3:
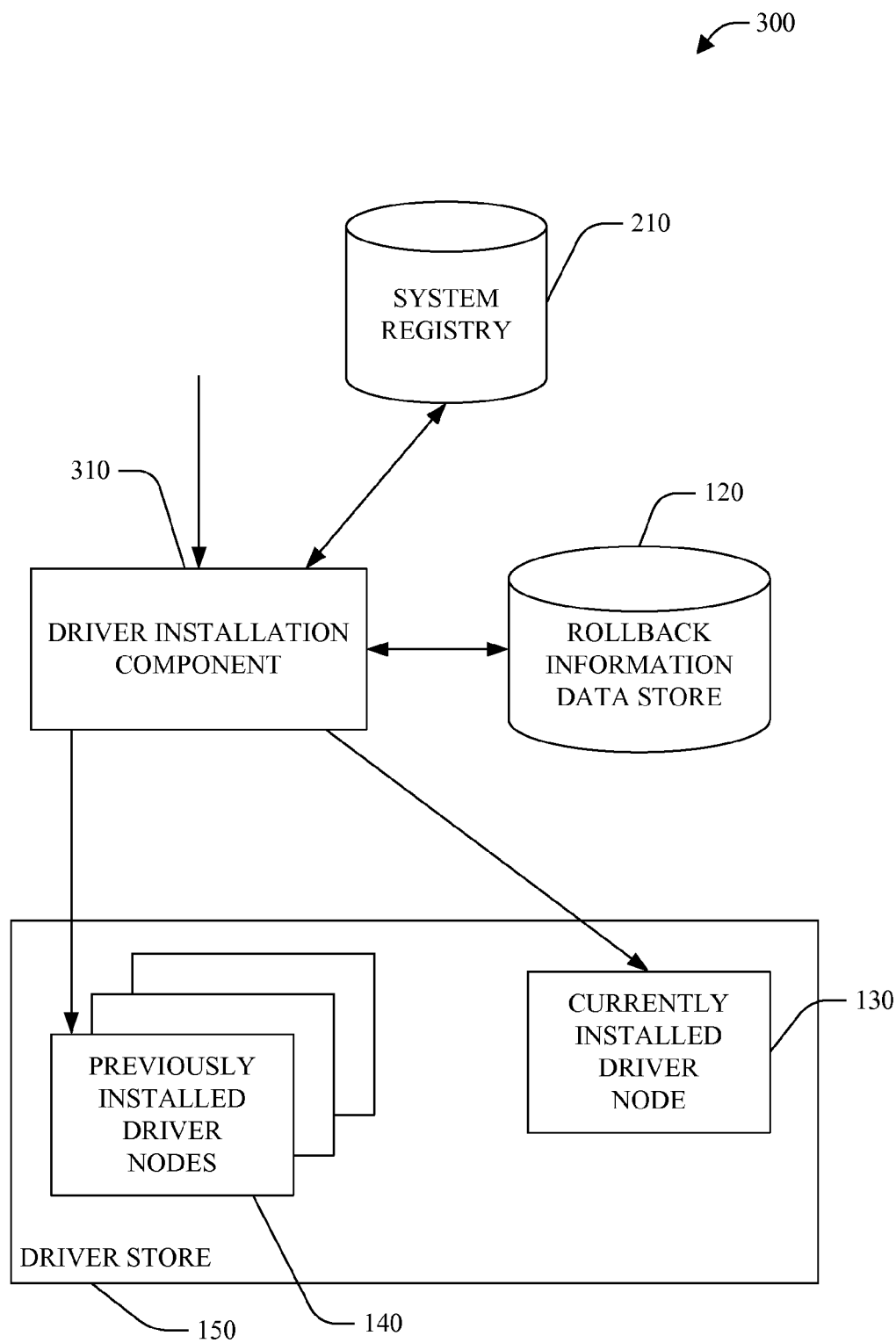
FIG. 3 is a block diagram of a device driver installation system in accordance with one or more embodiments.

Next, referring to FIG. 3, device driver installation system 300 in accordance with one or more embodiments is illustrated. The system 300 includes a driver installation component 310, a rollback information data store 120, a driver store 150, and, optionally, a system registry 210. The system 300 is employed to facilitate driver installation and/or driver update. When a request to install a driver on a device is received by the driver installation component 310, the driver installation component 310 determines whether an existing driver on the device. If so, the driver installation component 310 creates a rollback point for that driver in the rollback information data store 120 and the system registry 210. For example, the rollback point can be stored under a registry key containing the following information:

InfPath
    Description
    Manufacturer
    SectionName
    HardwareId
    Associated device instance identifier(s)
    (AssociatedDeviceInstanceIds)

As discussed previously, the infPath, description, manufacturer, section name and hardwareID enable the system 100, 200 to revert to a specific driver. The AssociatedDeviceInstanceIds provides information to the system 100, 200, 300 as to which specific device(s) are associated with the particular rollback point. If the rollback point already exists, the driver installation component 310 can update the AssociatedDeviceInstanceIds value.

After creating the rollback point (if need), the AssociatedDeviceInstanceIds value is updated with the device instance Id for the particular device. Further, the driver installation component 310 updates a property of the device that contains a list of previous rollback points, for example, under the restore point instance key. For example, the restore point instance value can be added to the beginning of the multi-string property PKEY_Device_RestorePoints. This property is a multi-string list of restore point instance values where the front of the list is the most recent restore point. Finally, the new driver is installed on the device by the device installation component 310. The driver installation component 310 creates the rollback point only if there is a driver currently on the device, and that driver appears to be working properly. In another example, the driver installation component 310 creates a rollback point all the way to the NULL driver (e.g., pristine state).

Those skilled in the art will recognize that, optionally, the device management systems 100, 200, 300 can store state and/or setting(s) associated with driver node(s). In this example, the state and/or setting(s) are employed instead of placing the driver back on the device in its initial state.

Figure 4:
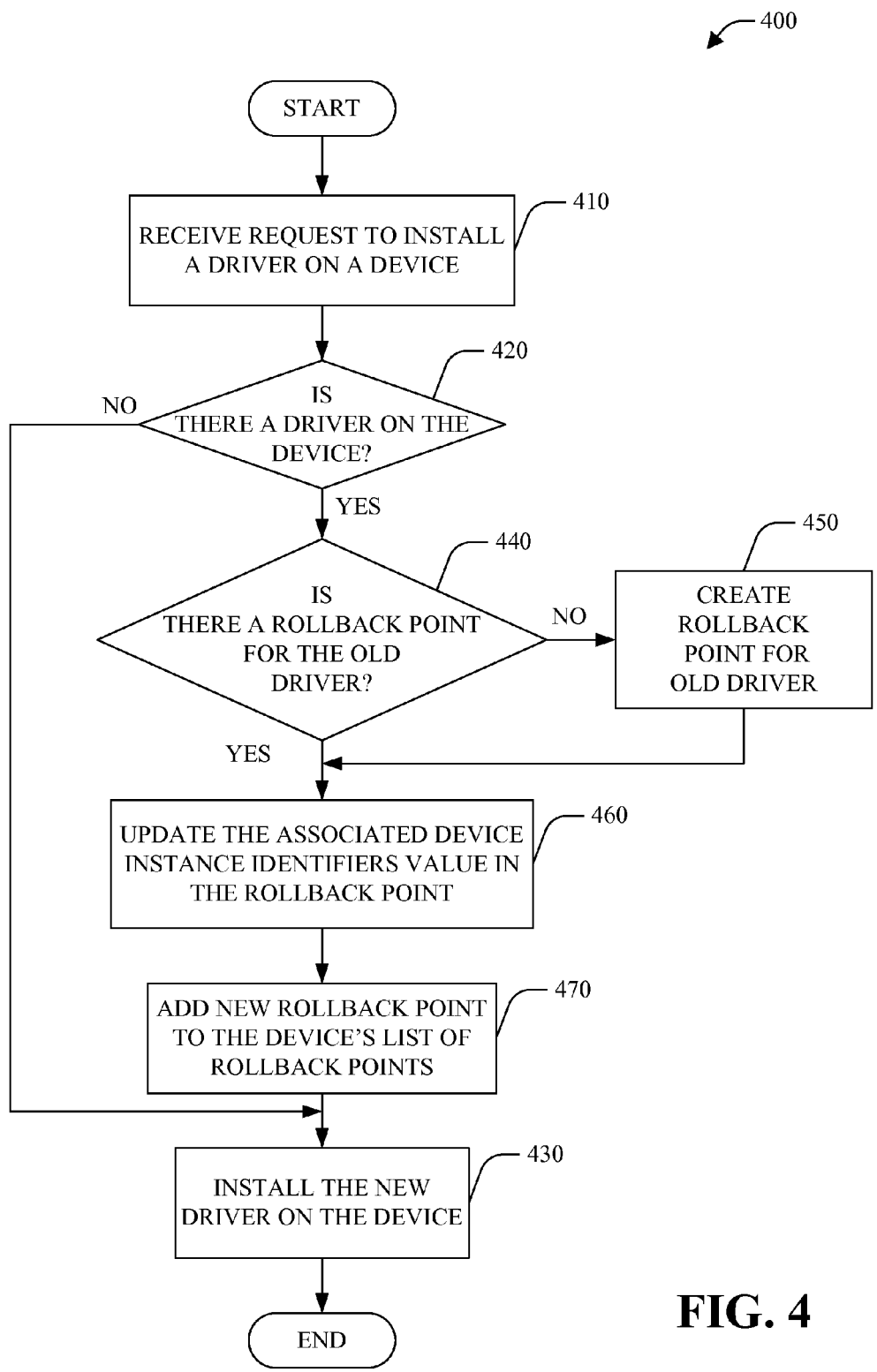
FIG. 4 is a flow chart of a method of installing a device driver in accordance with one or more embodiments.
Figure 5:
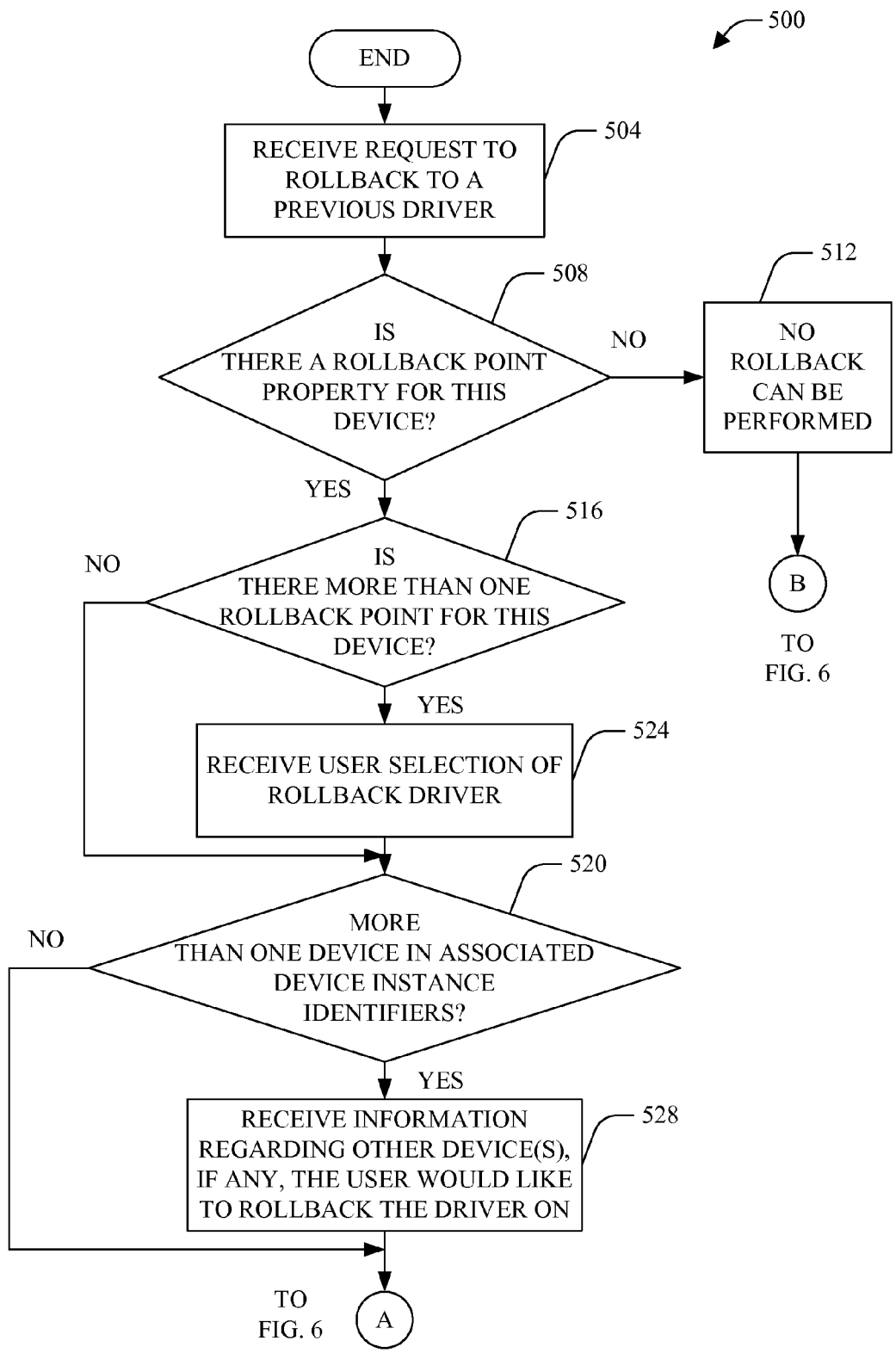
FIG. 5 is a flow chart of a method of performing a driver rollback in accordance with one or more embodiments.
Figure 6:
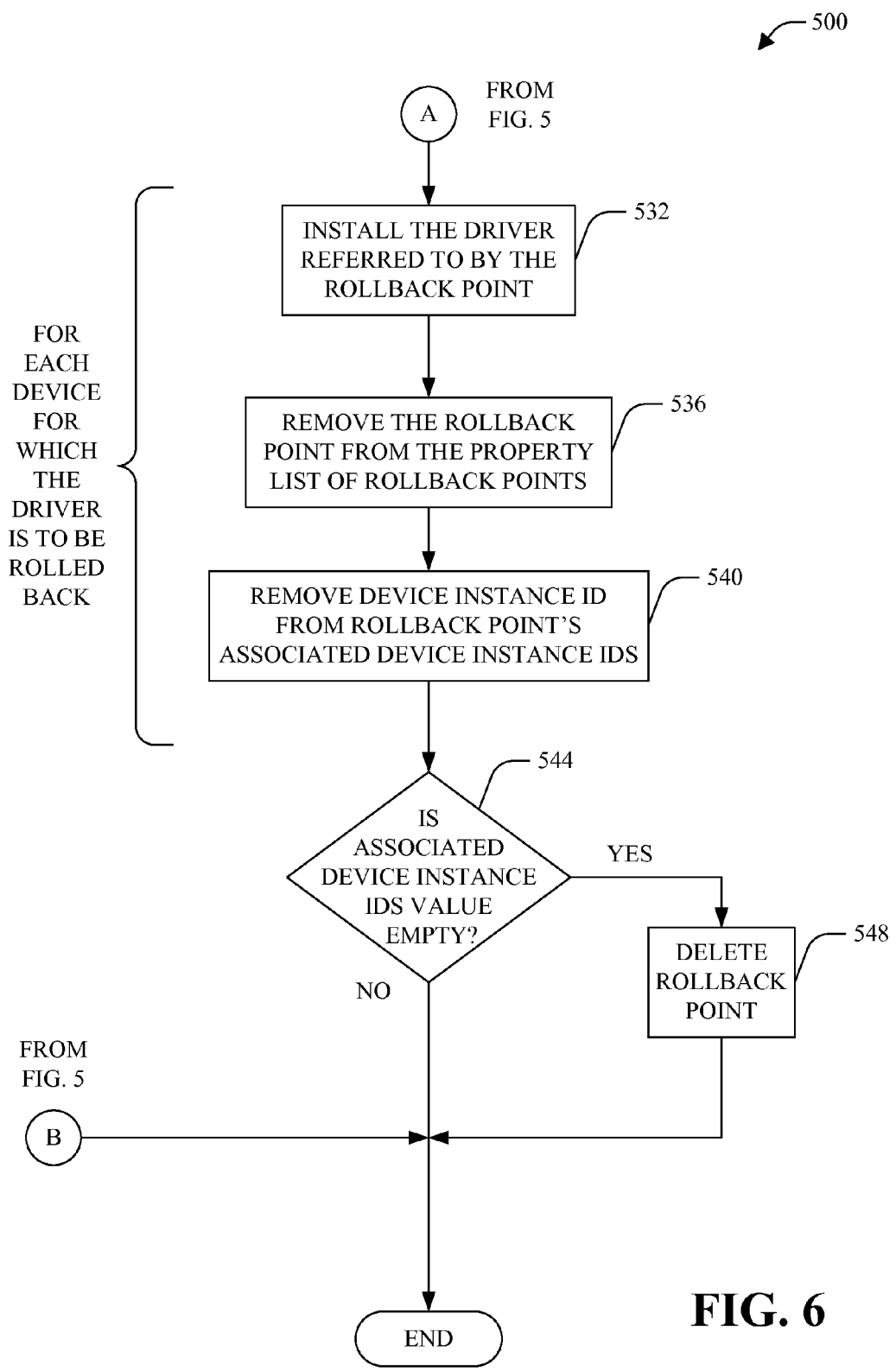
FIG. 6 is a flow chart further illustrating the method of FIG. 5 in accordance with one or more embodiments.

Turning briefly to FIGS. 4-6, methodologies that may be implemented in accordance with one or more embodiments are illustrated. While, for purposes of simplicity of explanation, the methodologies are shown and described as a series of blocks, it is to be understood and appreciated that the claimed embodiments are not limited by the order of the blocks, as some blocks may, in accordance with one or more embodiments, occur in different orders and/or concurrently with other blocks from that shown and described herein. Moreover, not all illustrated blocks may be utilized to implement the methodologies in accordance with one or more embodiments.

Embodiments may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 4, a method of installing a device driver 400 in accordance with one or more embodiments is illustrated. At 410, a request to install a driver on a device is received, for example, from a user. At 420, a determination is made as to whether a driver is installed on the device. If the determination at 420 is NO, processing continues at 430. If the determination at 420 is YES, at 440, a determination is made as to whether there is a rollback point for the old driver (e.g., installed driver). If the determination at 440 is NO, at 450, a rollback point is created for the old driver, and, processing continues at 460. If the determination at 440 is YES, at 460, the associated device instance identifiers value is updated in the rollback point. At 470, the new rollback point is added to the device's list of rollback points. At 430, the new driver is installed on the device.

Turning to FIGS. 5 and 6, a method of performing a driver rollback 500 in accordance with one or more embodiments is illustrated. At 504, a request to rollback to a previous driver is received. As discussed previously, the previous driver can be the NULL driver. At 508, a determination is made as to whether a rollback point property exists for the device. If the determination at 508 is NO, at 512, no rollback can be performed, and, no further processing occurs.

If the determination at 508 is YES, at 516, a determination is made as to whether there is more than one rollback point for the device. If the determination at 516 is NO, processing continues at 520. If the determination at 516 is YES, at 524, a user selection of a particular rollback driver is received. At 520, a determination is made as to whether there is more than one device in an associated device instance identifiers. If the determination at 520 is YES, at 528, the information is received regarding other device(s), if any, the user would like to rollback the driver on, and, processing continues at 532. If the determination at 520 is NO, processing continues at 532.

For each device for which the driver is to be rolled back, at 532, the driver referred to by the rollback point is installed. At 536, the rollback point is removed from the property list of rollback points. At 540, the device instance ID is removed from the rollback point's associated device instance ids. Once 532, 536 and 540 have been completed for each device for which the driver is to be rolled back, at 544, at determination is made as to whether the associated device instance ids value is empty. If the determination at 544 is YES, at 548, the rollback point is deleted, and, no further processing occurs. If the determination at 544 is NO, no further processing occurs.

Figure 7:
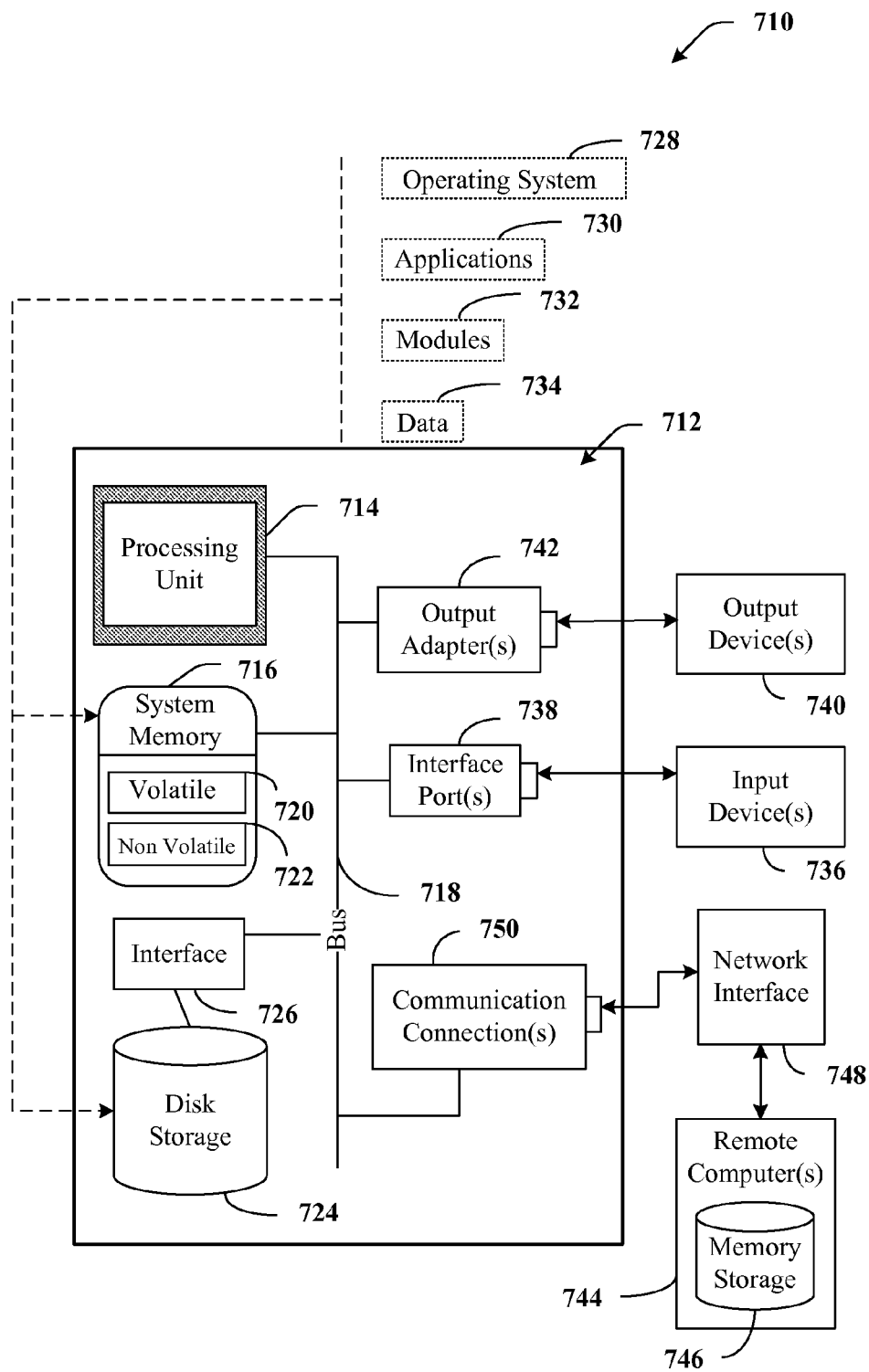
FIG. 7 illustrates an example operating environment in accordance with one or more embodiments.

In order to provide additional context for various aspects of one or more embodiments, FIG. 7 and the following discussion are intended to provide a brief, general description of a suitable operating environment 710 in which various aspects of one or more embodiments may be implemented. While one or more embodiments are described in the general context of computer-executable instructions, such as program modules, executed by one or more computers or other devices, those skilled in the art will recognize that embodiments can also be implemented in combination with other program modules and/or as a combination of hardware and software. Generally, however, program modules include routines, programs, objects, components, data structures, etc. that perform particular tasks or implement particular data types. The operating environment 710 is only one example of a suitable operating environment and is not intended to suggest any limitation as to the scope of use or functionality of one or more embodiments. Other well known computer systems, environments, and/or configurations that may be suitable for use with one or more embodiments include but are not limited to, personal computers, hand-held or laptop devices, multi-processor systems, microprocessor-based systems, programmable consumer electronics, network PCs, minicomputers, mainframe computers, distributed computing environments that include the above systems or devices, and the like.

With reference to FIG. 7, an exemplary environment 710 for implementing one or more embodiments includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/nonremovable, volatile/nonvolatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

While the computer 712 is configured to receive and/or transmit instructions via a signal bearing medium (e.g., as a carrier wave) to implement techniques discussed herein, computer storage media of the computer 712 are configured to store information and thus do not include a signal bearing medium.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that one or more embodiments can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers among other output devices 740 that use special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

What has been described above includes examples of one or more embodiments. One of ordinary skill in the art may recognize that many further combinations and permutations of one or more embodiments are possible. Accordingly, one or more embodiments are intended to embrace all such alterations, modifications and variations that fall within the spirit and scope of the appended claims Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method comprising:
receiving a request to install a first driver on a computing device, the first driver being configured to communicate with two or more devices associated with the computing device;
determining whether a second driver is already installed on the computing device, the second driver being configured to communicate with the two or more devices;
responsive to a determination that the second driver is already installed on the computing device, creating a rollback point that stores driver state information and, if selected, enables the first driver to be uninstalled from the computing device and the second driver to be installed on the computing device; and
adding the rollback point to a list of at least one other rollback point such that the list includes multiple rollback points that each correspond to a different driver state for the two or more devices and the at least one other rollback point associated with a different driver state than a current driver state for the first driver and the second driver, the list being usable to return the two or more devices to one of the multiple rollback points based at least in part on whether a restore point associated with the one of the multiple rollback points is a first rollback point for the two or more devices.

2. The computer-implemented method of claim 1, wherein the first driver comprises an updated version of the second driver.

3. The computer-implemented method of claim 1, wherein creating the rollback point includes associating data with the rollback point, the data including one or more of an initialization file path for one or more of the two or more devices, information about a manufacturer associated with one or more of the two or more devices, or one or more hardware identifiers associated with the two or more devices.

4. The computer-implemented method of claim 1, wherein the list includes a different rollback point that, if selected, enables both the first driver and the second driver to be uninstalled from the device.

5. The computer-implemented method of claim 4, further comprising receiving an indication of a selection of the different rollback point and, responsive to receiving the indication, uninstalling both the first driver and the second driver from the device.

6. The computer-implemented method of claim 1, further comprising:
installing the first driver on the computing device and uninstalling the second driver;
receiving an indication that the first driver has crashed; and
responsive to receiving the indication, uninstalling the first driver and reinstalling the second driver based on the rollback point.

7. The computer-implemented method of claim 1, wherein at least one of the multiple rollback points corresponds to a null state where no drivers are installed for the two or more devices.

8. The computer-implemented method of claim 1, further comprising:
installing the first driver on the computing device and uninstalling the second driver;
receiving an indication of a selection of the rollback point; and
responsive to receiving the indication, uninstalling the first driver and reinstalling the second driver.

9. The computer-implemented method of claim 8, wherein the indication of the selection of the rollback point is received responsive to a failure of one or more of the two or more devices.

10. A computer-implemented method comprising:
receiving a request to return a computing device to an installation restore point for a particular driver;
determining that multiple devices are associated with the installation restore point and communicate via the particular driver;
determining whether to return the multiple devices to the installation restore point based at least in part on whether the installation restore point is a first rollback point for the multiple devices; and
responsive to an indication to return the multiple devices to the installation restore point, returning the computing device and the multiple devices to the installation restore point.

11. The computer-implemented method of claim 10, wherein the request to return the computing device to the installation restore point is received responsive to an indication of a failure of the particular driver.

12. The computer-implemented method of claim 10, wherein the particular driver comprises a driver that enables the multiple devices to communicate with the computing device.

13. The computer-implemented method of claim 10, wherein returning the multiple devices to the installation restore point comprises:
uninstalling the particular driver; and
installing one or more previous versions of the particular driver.

14. The computer-implemented method of claim 10, wherein the particular driver and the one or more other drivers are each associated with a different device, and wherein returning the multiple devices to the installation restore point comprises putting the computing device in a state where no driver is installed for multiple devices.

15. One or more computer storage media comprising computer-executable instructions that are executable by a computing device to cause the computing device to perform operations comprising:
storing rollback information associated with device drivers, the rollback information including, for a single device, multiple rollback points associated with a plurality of previously installed device driver states for the single device;
receiving an indication of a selection of one of the multiple rollback points;
responsive to the indication, determining that multiple devices communicate via one of the plurality of drivers associated with the selected one of the multiple rollback points; and
responsive to said determining, causing the multiple devices to revert to one of the plurality of previously installed device driver states associated with the one of the plurality of drivers and based at least in part on whether the one of the plurality of previously installed device driver states corresponds to a restore point that is a first rollback point of the multiple rollback points for the multiple devices.

16. The one or more computer storage media of claim 15, wherein each of the plurality of previously installed device driver states corresponds to an installation of a particular driver for the single device.

17. The one or more computer storage media of claim 15, wherein two or more of the plurality of previously installed device driver states correspond to installations of different versions of a particular driver for the single device.

18. The one or more computer storage media of claim 15, wherein at least one of the plurality of previously installed device driver states corresponds to a state where no driver is installed for the single device.

19. The one or more computer storage media of claim 15, wherein at least one of the multiple rollback points corresponds to a subsequent device driver state of the plurality of previously installed device driver states that was created subsequent to the one of the plurality of previously installed device driver states, and wherein the operations further comprise deleting the at least one of the multiple rollback points responsive to reverting to the one of the plurality of previously installed device driver states.

20. The one or more computer storage media of claim 15, wherein the indication of the selection of the one of the multiple rollback points is received responsive to a failure of one of the device drivers.

* * * * *